P. UMHOLTZ.
Coal Breaker.
No. 48,224.
Patented June 13, 1865.
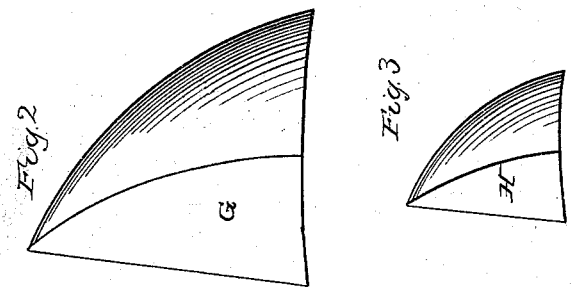
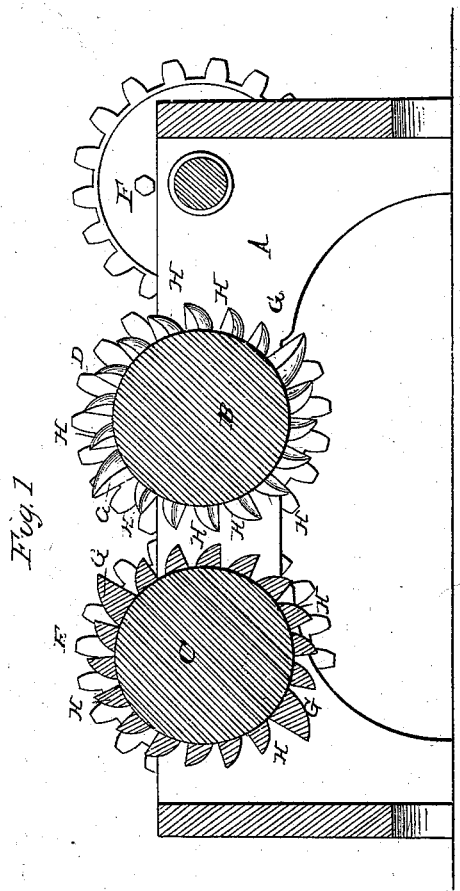

UNITED STATES PATENT OFFICE.

PHILIP UMHOLTZ, OF TREMONT, PENNSYLVANIA.

COAL-BREAKER.

Specification forming part of Letters Patent No. 48,224, dated June 13, 1865.

*To all whom it may concern:*

Be it known that I, PHILIP UMHOLTZ, of Tremont, Schuylkill county, State of Pennsylvania, have made new and useful Improvements in Coal-Breakers; and I do hereby declare the following to be a full, clear, and exact description of the nature, construction, and operation of the same, reference being had to the accompanying drawings, which are made part of this specification, and in which—

Figure 1 represents a longitudinal vertical section of the apparatus transversely to the axes of the shafts. Fig. 2 is a detached view of one of the larger teeth on an enlarged scale. Fig. 3 is on the same scale as Fig. 2, and shows the relative proportions of the smaller teeth.

Similar letters refer to like parts in the different figures.

The object of my invention is to operate more efficiently upon the coal by means of an occasional set of large teeth set in such a manner on each of the cylinders as to act in combination with each other to grasp and drag in the larger masses of coal which the smaller teeth, which form the majority on the periphery of the rollers, fail to catch.

To enable one skilled in the branch of manufacturing to which my invention is allied to construct and use the same, I will proceed to describe it.

A is a frame, in which are journaled two rollers, B C, whose motions are made uniform by means of the spur-wheels D E, whose teeth interlock. They are driven by the spur-wheel F, which gears into the wheel E, the wheel F being revolved from any prime motor. The number of rows of teeth on the rollers is not definitely stated in terms; but I have shown eighteen as an illustration of the point, and there are two rows of large teeth, G, with eight rows of small teeth, H, in the intervals between the large ones. The respective sizes may be seen in Figs. 2 and 3.

The average or ordinary sizes of coal-lumps may be caught and mashed by means of the smaller teeth; but occasionally larger ones are presented, which merely roll over as they are struck by the small teeth, which fail to reach the salient or overhanging portions of the large lumps so as to grasp and mash them. Two rows of large teeth upon the peripheries of the rollers are assigned to the duty of drawing in the lumps which the small teeth had failed to grasp. The shape of the teeth is adapted to split and clear their way, as they traverse edge first.

Having thus described my invention, what I claim therein as new, and desire to secure by Letters Patent, is—

Making the toothed roller of the coal-breaker with an occasional row of large teeth set at distant intervals, substantially as and for the purpose described.

P. UMHOLTZ.

Witnesses:
 ADAM WOLF,
 DANIEL RAMBERGER.